US008917689B2

(12) United States Patent
Chen et al.

(10) Patent No.: US 8,917,689 B2
(45) Date of Patent: *Dec. 23, 2014

(54) METHOD, BASE STATION, AND USER EQUIPMENT FOR FEEDING BACK ACK/NACK INFORMATION FOR CARRIER AGGREGATION

(71) Applicant: Huawei Technologies Co., Ltd., Shenzhen (CN)

(72) Inventors: Xiaobo Chen, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,413

(22) Filed: Dec. 21, 2012

(65) Prior Publication Data
US 2013/0107846 A1 May 2, 2013

Related U.S. Application Data

(63) Continuation of application No. 13/487,172, filed on Jun. 2, 2012, which is a continuation of application No. PCT/CN2010/079423, filed on Dec. 3, 2010.

(30) Foreign Application Priority Data

Dec. 3, 2009 (CN) .......................... 2009 1 0251390
Mar. 24, 2010 (CN) .......................... 2010 1 0137731

(51) Int. Cl.
H04W 72/04 (2009.01)
H04L 1/16 (2006.01)
H04L 1/18 (2006.01)
H04L 5/00 (2006.01)

(52) U.S. Cl.
CPC ........... *H04W 72/042* (2013.01); *H04L 1/1685* (2013.01); *H04L 1/1896* (2013.01); *H04L 5/001* (2013.01); *H04L 5/0055* (2013.01); *H04L 1/1812* (2013.01); *H04L 5/0094* (2013.01)
USPC .............................. 370/329; 370/322; 370/341

(58) Field of Classification Search
USPC ......................................... 370/329, 322, 341
See application file for complete search history.

(56) References Cited

U.S. PATENT DOCUMENTS 7,570,970 B2 8/2009 Duan et al.
2009/0197630 A1* 8/2009 Ahn et al. ..................... 455/522

(Continued)

FOREIGN PATENT DOCUMENTS

CN 101594211 A 12/2009
CN 101998509 A 3/2011

(Continued)

OTHER PUBLICATIONS

"Details of Ack/Nak bundling for TDD" by Ericsson, May 2008.*

(Continued)

*Primary Examiner* — Dang Ton
*Assistant Examiner* — Pamit Kaur
(74) *Attorney, Agent, or Firm* — Slater & Matsil, L.L.P.

(57) ABSTRACT

The present invention provides a method, a base station, and a user equipment for feeding back ACK/NACK information for carrier aggregation. The method includes configuring a common field preset in DCI as at least one type of command field related to ACK/NACK feedback of at least two types of command fields related to ACK/NACK feedback, where the common field can be configured as the command fields related to ACK/NACK feedback; and sending the DCI to a user equipment, so that the user equipment feeds back ACK/NACK information according to the DCI.

20 Claims, 6 Drawing Sheets

(56) References Cited

U.S. PATENT DOCUMENTS

| | | | |
|---|---|---|---|
| 2010/0103899 A1 | 4/2010 | Kwak et al. | |
| 2012/0140726 A1* | 6/2012 | Moon et al. | 370/329 |
| 2012/0155316 A1 | 6/2012 | Li et al. | |
| 2012/0224553 A1* | 9/2012 | Kim et al. | 370/329 |
| 2012/0236812 A1* | 9/2012 | Chen et al. | 370/329 |

FOREIGN PATENT DOCUMENTS

| | | |
|---|---|---|
| JP | 2010521942 A | 6/2010 |
| JP | 2010539847 A | 12/2010 |
| RU | 2005124991 A | 2/2007 |
| WO | 2009041785 A2 | 4/2009 |
| WO | 2009116760 A2 | 9/2009 |

OTHER PUBLICATIONS

Nokia, et al., "DAI Design for TDD configuration #5 (9:1) in ACK/Nack Bundling," 3GPP TSG RAN WG1 Meeting #53bis, R1-082615, Warzaw, Poland, Jun. 30-Jul. 4, 2008, 7 pages.

Ericsson, "Details of ACK/NAK bundling for TDD," TSG-RAN WG1 #53, R1-082002, Kansas City, MO, May 5-9, 2008, 6 pages.

CMCC, "UL ACK/NACK and CQI feedback in Carrier Aggregation," 3GPP TSG RAN WG1 meeting #58, R1-093269, Shenzhen, China, Aug. 24-28, 2009, 2 pages.

International Search Report received in International Application No. PCT/CN2010/079423 Applicant: Huawei Technologies Co. Ltd. et al., mailed Mar. 10, 2011, 3 pages.

Written Opinion of the International Searching Authority received in International Application No. PCT/CN2010/079423 Applicant: Huawei Technologies Co. Ltd. et al., mailed Mar. 10, 2011, 5 pages.

Extended European Search Report received in European Application No. 10834239.5-2415, Applicant: Huawei Technologies Co. Ltd., mailed Jul. 27, 2012, 5 pages.

First Chinese Office Action of Chinese Application No. 201010137731.2 mailed Aug. 27, 2012, 7 pages. (Partial Translation).

$3^{rd}$ Generation Partnership Project; Technical Specification Group Radio Access Network; Evolved Universal Terrestrial Radio Access (E-UTRA); Physical layer procedures (Release 8), 3GPP TS 36.213 V8.8.0, Sep. 2009, 77 pages.

Ericsson, et al., "PUCCH transmission for Carrier Aggregation," 3GPP TSG RAN WG1 Meeting #58bis, R1-094273, Miyazaki, Japan, Oct. 12-16, 2009, 3 pages.

$3^{rd}$ Generation Partnership Project; Technical Specification Group Radio Access Network; Evolved Universal Terrestrial Radio Access (E-UTRA); Multiplexing and channel coding (Release 8), 3GPP TS 36.212 V8.7.0, May 2009, 60 pages.

Australian Patent Examination Report received in Application No. 2010327189, Applicant: Huawei Technologies Co., Ltd., issued Aug. 9, 2013, 3 pages.

Second Office Action of Chinese Application No. 201010137731.2 mailed May 2, 2013, 12 pages. (Partial Translation).

3rd Generation Partnership Project; Technical Specification Group Radio Access Network; Evolved Universal Terrestrial Radio Access (E-UTRA); Physical layer procedures (Release 8), 3GPP TS 36.213, V8.6.0, Mar. 2009, 77 pages.

Extended European Search Report received in Application No. 13185753.4-1860 mailed Oct. 29, 2013, 6 pages.

Japanese Office Action for Application No. 2012-541313, mailed Nov. 12, 2013, 5 pages.

Huawei, "UL ACK/NACK Feedback Related DCI Design for Carrier Aggregation," 3GPP TSG RAN WG1 Meeting #60bis, R1-101943, Beijing, China, Apr. 12-16, 2010, 4 pages.

* cited by examiner

METHOD, BASE STATION, AND USER EQUIPMENT FOR FEEDING BACK ACK/NACK INFORMATION FOR CARRIER AGGREGATION

This application is a continuation of U.S. application Ser. No. 13/487,172, filed on Jun. 2, 2012, which is a continuation of International Application No. PCT/CN2010/079423, filed on Dec. 3, 2010, which claims priority to Chinese Patent Application No. 200910251390.9, filed on Dec. 3, 2009 and Chinese Patent Application No. 201010137731.2, filed on Mar. 24, 2010, all of which are hereby incorporated by reference in their entireties.

TECHNICAL FIELD

The present invention relates to the field of mobile communications technologies, and in particular to a method, a base station, and a user equipment for feeding back ACK/NACK information for carrier aggregation.

BACKGROUND

In the hybrid automatic repeat request (Hybrid Automatic Repeat Request, HARQ) technology, a data receiver needs to feed back acknowledgement/negative-acknowledgement (Acknowledgement/Negative-acknowledgement, ACK/NACK) information to a data sender to help to determine whether data is correctly received. In an uplink direction of a 3rd Generation Partnership Project (3rd Generation Partnership Project, 3GPP) Evolved Universal Terrestrial Radio Access (Evolved Universal Terrestrial Radio Access, E-UTRA) system, a user equipment feeds back ACK/NACK information about downlink data reception to a base station through a physical uplink control channel (Physical Uplink Control Channel, PUCCH). The 3GPP E-UTRA system is also known as a Long Term Evolution (Long Term Evolution, LTE) system. In the following description, the PUCCH channel used by the user equipment to feed back ACK/NACK information about downlink data reception to the base station is referred to as an uplink ACK channel.

In the LTE system, the feedback of the ACK/NACK information may be controlled through downlink control information (Downlink Control Information, DCI). The DCI is used to indicate scheduling information transmitted over a PDSCH and is transmitted over a physical downlink control channel (Physical Downlink Control Channel, PDCCH) corresponding to the physical downlink shared channel (Physical Downlink Shared Channel, PDSCH) indicated by the DCI. The DCI includes a transmission power control (Transmission Power Control, TPC) command field, which is used to adjust transmission power of the uplink ACK channel to send the ACK/NACK information. The TPC command field is generally 2 bits long. Particularly, in an LTE time division duplex (Time Division Duplex, TDD) system, one user equipment may feed back ACK/NACK information corresponding to PDSCH data transmission of multiple downlink subframes in one uplink subframe. Specifically, the LTE TDD system supports two ACK/NACK information feedback modes, which are an ACK/NACK multiplexing mode (ACK/NACK Multiplexing Mode) and an ACK/NACK bundling mode (ACK/NACK Bundling Mode) respectively. In the ACK/NACK multiplexing mode, uplink ACK/NACK information corresponding to each PDSCH data transmission is fed back to the base station independently. In the ACK/NACK bundling mode, uplink ACK/NACK information corresponding to multiple times of PDSCH data transmission is fed back to the base station together after a logic AND operation. To support the ACK/NACK bundling mode, a 2-bit downlink assignment index (Downlink Assignment Index, DAI) command field is introduced in the DCI and is used to indicate the number of PDCCHs that carry the DCI.

In an LTE-Advanced (LTE-Advanced, LTE-A) system, a carrier aggregation technology is chosen to support wider bandwidth so as to meet requirements of the International Telecommunication Union (International Telecommunication Union, ITU) on a peak data rate of the 4th generation communications technology. In the carrier aggregation technology, the spectrums of two or more component carriers are aggregated together to get wider transmission bandwidth, and every component carrier has an independent HARQ process. An LTE-A user equipment may be configured with different numbers of uplink and downlink component carriers. When the LTE-A user equipment accesses multiple downlink component carriers simultaneously, ACK/NACK information corresponding to the data transmission over PDSCH of every downlink component carrier is fed back over the uplink ACK channel. When the ACK/NACK information corresponding to the data transmission of multiple downlink component carriers needs to be fed back over a same uplink component carrier, a problem of feeding back the ACK/NACK information corresponding to the data transmission of multiple downlink component carriers over the same uplink component carrier needs to be solved.

With reference to the LTE TDD system, in the LTE-A system, when a user equipment is configured with multiple downlink component carriers to receive data, feedback of the uplink ACK/NACK information corresponding to the data transmission of the multiple downlink component carriers may also adopt the ACK/NACK multiplexing mode or ACK/NACK bundling mode. Likewise, the DCI information may be adopted to control the feedback of ACK/NACK information. For example, a TPC command field is used to control the transmission power of an uplink component carrier and a DAI command field is used to support the ACK/NACK bundling mode.

Particularly, in a carrier aggregation LTE-A system, considering the relatively small number of users simultaneously scheduled over multiple downlink component carriers, the uplink ACK channel assignment for the user equipment may be notified by the base station through explicit signaling. One manner is that the base station directly notifies the assigned uplink ACK channel resources through high-level signaling. To increase the statistical multiplexing probability of uplink ACK channels of different user equipment, another manner is that the base station assigns a group of ACK channel resources to the user equipment through high-level signaling and adds an ACK resource indication (ACK Resource Indication, ARI) command field to the DCI information carried by the PDCCH to further indicate which one of the group of high-level assigned uplink ACK channel resources is used currently. The ARI command field does not exist in the LTE system and needs to be introduced additionally in the LTE-A system. The number of bits depends on the number of the high-level assigned uplink ACK channel resources, and generally 2 bits are considered enough.

In the carrier aggregation LTE-A system, to solve the problem of feeding back ACK/NACK information corresponding to the data transmission of multiple downlink component carriers over the same uplink component carrier, it may be necessary to introduce a DAI command field and/or an ARI command field on the basis of the DCI in the LTE system.

Therefore, an ACK/NACK information feedback solution that is backward compatible with the LTE system needs to be provided.

SUMMARY OF THE INVENTION

Embodiments of the present invention provide a method, a base station, and a user equipment for feeding back ACK/NACK information for carrier aggregation, which realize the ACK/NACK information feedback that is backward compatible with an LTE system in carrier aggregation.

An embodiment of the present invention provides a method for feeding back ACK/NACK information for carrier aggregation, including configuring a common field preset in downlink control information, DCI, as at least one type of command field related to ACK/NACK feedback, where the common field can be configured as the command fields related to ACK/NACK feedback, and sending the DCI to a user equipment, so that the user equipment feeds back ACK/NACK information according to the DCI.

An embodiment of the present invention further provides a method for feeding back ACK/NACK information for carrier aggregation, including receiving downlink control information, DCI, which is sent by a base station and transmitted by a downlink component carrier, and feeding back ACK/NACK information according to a command field which is related to ACK/NACK feedback and configured in a common field preset in the DCI, where the common field can be configured as at least two types of command fields related to ACK/NACK feedback.

An embodiment of the present invention provides a base station, including a configuring module, configured to configure a common field preset in downlink control information, DCI, as at least one type of command field related to ACK/NACK feedback, where the common field can be configured as the at least two types of command fields related to ACK/NACK feedback and a sending module, configured to send the DCI to a user equipment, so that the user equipment feeds back ACK/NACK information according to the DCI.

An embodiment of the present invention provides a user equipment, including a receiving module, configured to receive downlink control information, DCI, which is sent by a base station and transmitted by a downlink component carrier, and a feedback module, configured to feed back ACK/NACK information according to a command field which is related to ACK/NACK feedback and configured in a common field preset in the DCI, where the common field can be configured as at least two types of command fields related to ACK/NACK feedback.

It can be known from the foregoing technical solutions that, in the embodiments of the present invention, a common field that can be configured as at least two types of command fields related to ACK/NACK feedback is preset in the DCI, so the common field may be configured as different command fields so as to be different required command fields related to ACK/NACK feedback for LTE-A carrier aggregation, which realizes the ACK/NACK information feedback that is backward compatible with an LTE system in carrier aggregation.

BRIEF DESCRIPTION OF THE DRAWINGS

To explain the technical solutions in the embodiments of the present invention more clearly, accompanying drawings required in the description of the embodiments are briefly introduced below. Apparently, the accompanying drawings to be described in the following are only some embodiments of the present invention. Those of ordinary skill in the art may also derive other drawings from these accompanying drawings without creative efforts.

DETAILED DESCRIPTION OF ILLUSTRATIVE EMBODIMENTS

To make the purpose, technical solutions and benefits in the embodiments of the present invention clearer, the technical solutions in the embodiments of the present invention are described below in detail with reference to the accompanying drawing in the embodiments of the present invention. Apparently, the described embodiments herein are only part of rather than all embodiments of the present invention. Based on the embodiments of the present invention, all other embodiments derived by those of ordinary skill in the art without creative efforts shall fall within the protection scope of the present invention.

Figure 1:
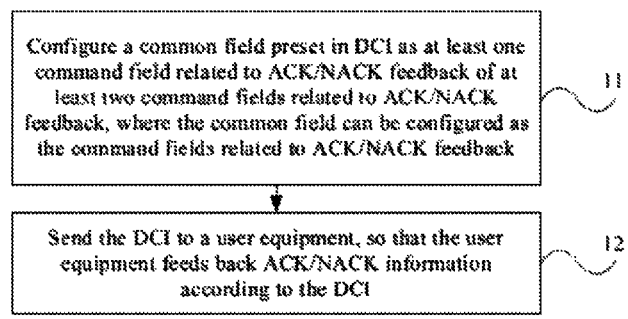
FIG. 1 is a schematic flowchart of a method according to a first embodiment of the present invention.

FIG. 1 is a schematic flowchart of a method according to a first embodiment of the present invention.

Step 11: A base station configures a common field preset in DCI as at least one type of command field related to ACK/NACK feedback of at least two types of command fields related to ACK/NACK feedback, where the common field can be configured as the command fields related to ACK/NACK feedback.

The at least two types of command fields related to ACK/NACK feedback include at least a DAI command field and/or an ARI command field. In addition, the at least two types of command fields related to ACK/NACK feedback may further include a TPC command field or other command fields that the DCI may have, such as a carrier indication command field and a redundant version command field.

In different scenarios, the common field may be configured as different command fields. The different scenarios may be different feedback modes. For example, when the feedback mode of the ACK/NACK information is a bundling feedback mode, the common field is configured as the DAI command field; when the feedback mode of the ACK/NACK information is a multiplexing feedback mode, the common field is configured as the ARI command field. The different scenarios may also be different types of downlink component carriers. For example, the common field in the DCI transmitted over a system-linked downlink component carrier is configured as the TPC command field; and the common field in the DCI transmitted over a non system-linked downlink component carrier is configured as the ARI command field and/or the DAI command field. For the specific definitions of the system-linked downlink component carrier and non-system-linked downlink component carrier, reference may be made to the following description.

Specifically, at one moment, the common field in the DCI transmitted over every downlink component carrier is respectively configured as a specific command field. The common field transmitted by every downlink component carrier may be configured as a same command field; or the common field transmitted by the system-linked downlink component carrier and the common field transmitted by the non system-linked downlink component carrier may be configured as different command fields respectively.

Step 12: The base station sends the DCI to a user equipment, so that the user equipment feeds back ACK/NACK information according to the DCI.

Specifically, through the foregoing flexible configuration of the common field, the DCI may have different control command fields related to ACK/NACK information feedback. Therefore, the user equipment may parse the DCI to obtain the related control command field so as to realize the feedback of ACK/NACK information for carrier aggregation.

Further, before step 11, the method may include that the base station sets the common filed in the DCI, which realizes the flexible configuration of the common field.

In the embodiment of the present invention, a public field is set in the DCI and the public field may be configured as different command fields in different scenarios. Therefore, from the perspective of effectiveness, the common field is equivalent to the sum of command fields that the common field may be configured as, which realizes the representation of more command fields by using a smaller number of bits, and reduces bit overheads and the complexity of design and implementation. Therefore, the number of bits of the DCI information in an LTE-A system is kept consistent with that in an LTE system as much as possible, which realizes compatibility with the LTE system, so that most design in the LTE system is passed down to the LTE-A system.

In a carrier aggregation LTE-A system, it may be necessary to add an ARI command field; in an FDD system, an additional DAI command field may be required further. If the command fields are added independently, and in an example in which the ARI command field and the DAI command field are both 2 bits long, 4 more bits are occupied by the DCI information in the FDD system. This is not good for the compatibility with the LTE system and what's more, increases the bit overheads and the complexity of design and implementation. For example, more bits occupied by the DCI information complicate the design of blind detection. Therefore, in the embodiment of the present invention, a common field is set in the DCI. The command filed represented by the common field is not fixedly configured but may be configured as the DAI command field, or the ARI command field, or the TPC command field, or other command fields according to different scenarios. Therefore, one filed has the meanings of multiple command fields, which realized that the required multiple command fields are represented by fewer fields so that the bit overheads and the complexity of design and implementation is reduced.

In a specific embodiment, the common field may be set in a manner of adding bits in the DCI. For example, a 2-bit field is added as the common field, and, according to different scenarios, the common field may be configured as the DAI command field or ARI command field. Compared with the conventional manner where the DAI command field and the ARI command field need to be added, the manner in the embodiment of the present invention occupies fewer bits. That is, in the embodiment of the present invention, only 2 bits need to be added, while 4 bits need to be added in the conventional mode.

Although the manner of adding a new common field has advantages over the prior art, the manner of adding the new common field still adds to the bits of the DCI. For compatibility with the prior art, a more preferable manner is to make full use of the existing command fields in the DCI to set a common field without increasing the bits occupied by the DCI.

To keep compatibility with the LTE system, the command fields in the DCI of the LTE system, such as the TPC command field, modulation and coding scheme command field, new data indication command field, and redundant version command field, are passed down to the DCI of the LTE-A system. In addition, to support some LTE-A specific functions, some special command fields are added for the LTE-A user equipment, for example, a carrier indication command field used to support cross-carrier scheduling of PDSCH transmission by a PDCCH.

One or more of the foregoing LTE-A command fields may be used as the common field. For example, the DCI information of an LTE-A user equipment that supports cross-carrier scheduling of a PDSCH by a PDCCH includes a 3-bit carrier indication command field; when the number of aggregated carriers of the user equipment is small, the 3-bit carrier indication command field has some redundant bits or redundant states. The 3 bits may be used as a common field, and the redundant bits or redundant states may be used to transmit the carrier indication command field, and/or the ARI command field, and/or the DAI command field simultaneously. For another example, the redundant version command field is used to indicate the redundant version of the current PDSCH transmission in a physical layer HARQ process, and the 2 bits corresponding of the redundant version command field may be used as the common field. For an initial PDSCH transmission, the common field is used as the ARI command field and a preset default redundant version is used. For a PDSCH retransmission, the common field is used as the redundant version command field and the same uplink ACK channel as that for the initial transmission is assigned for the retransmission. However, no matter whether the common field is designed based on the existing carrier indication command field or redundant version command field, a great loss of scheduling flexibility is brought.

During the implementation of the present invention, the inventor finds that, in the case of one user equipment, for a PDSCH transmitted over a downlink component carrier that are configured to feed back ACK/NACK information over the same uplink component carrier, the DCI that carries scheduling information of the PDSCH has the same TPC command field at a same moment. This is because the TPC command fields are all used to control the transmission power of the uplink ACK channel on a same uplink component carrier. Because the TPC command field included in each DCI is the same, the TPC command field is redundant to the system, so the TPC command field may be fully utilized and configured as a common field. According to whether the common field is carried in the DCI of a system-linked downlink component carrier, the common field that replaces the original TPC command field may be configured as a TPC command field, a DAI command field and/or an ARI command field.

Figure 2:
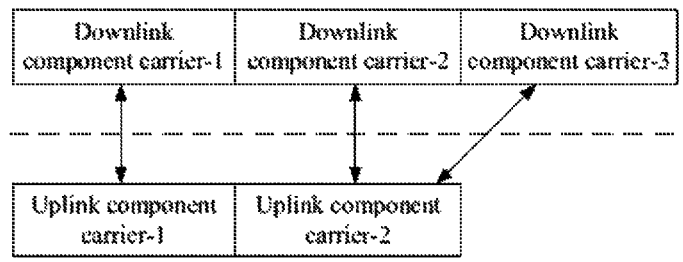
FIG. 2 is a schematic composition diagram of a system-linked downlink component carrier according to an embodiment of the present invention.

In the LTE system, the uplink ACK channel may be mapped implicitly from a PDCCH that carries the DCI. In a carrier aggregation LTE-A system, to keep compatibility with user equipment that only supports an early version of the LTE, uplink ACK channel resources are reserved on one uplink component carrier for implicit mapping from the PDCCH transmitted over one or more downlink component carriers. For ease of description, if an uplink ACK channel resource implicitly mapped from a PDCCH is reserved on one uplink component carrier for a certain downlink component carrier, the downlink component carrier is described as a "system-linked downlink component carrier" of the uplink component carrier. FIG. 2 is a schematic composition diagram of a system-linked downlink component carrier according to an embodiment of the present invention. As shown in FIG. 2, there are three downlink component carriers in a carrier aggregation LTE-A system, namely, downlink component carrier-1, downlink component carrier-2, and downlink component carrier-3, and two uplink component carriers, namely, uplink component carrier-1 and uplink component carrier-2. An uplink ACK channel resource implicitly mapped from a PDCCH is reserved on uplink component carrier-1 for downlink component carrier-1; uplink ACK channel resources implicitly mapped from PDCCHs are reserved on uplink component carrier-2 for downlink component carrier-2 and downlink component carrier-3. Therefore, downlink component carrier-1 is a system-linked downlink component carrier of uplink component carrier-1; and downlink component carrier-2 and downlink component carrier-3 are system-linked downlink component carriers of uplink component carrier-2. In a carrier aggregation LTE-A system, to avoid high overhead of uplink ACK channel resources reserved on an uplink component carrier through implicit mapping from PDCCHs, the number of system-linked downlink component carriers of the uplink component carrier may be small.

In the following embodiments, the case that the multiple downlink component carriers of one user equipment are configured to feed back ACK/NACK information over a same uplink component carrier is taken for example. When one user equipment is configured to feed back ACK/NACK information over multiple uplink component carriers at the same time, downlink component carriers that feed back ACK/NACK information over the same uplink component carrier are regarded as one downlink component carrier group, and different downlink component carrier groups is processed respectively according to the manner described in the embodiment of the present invention.

Figure 3:
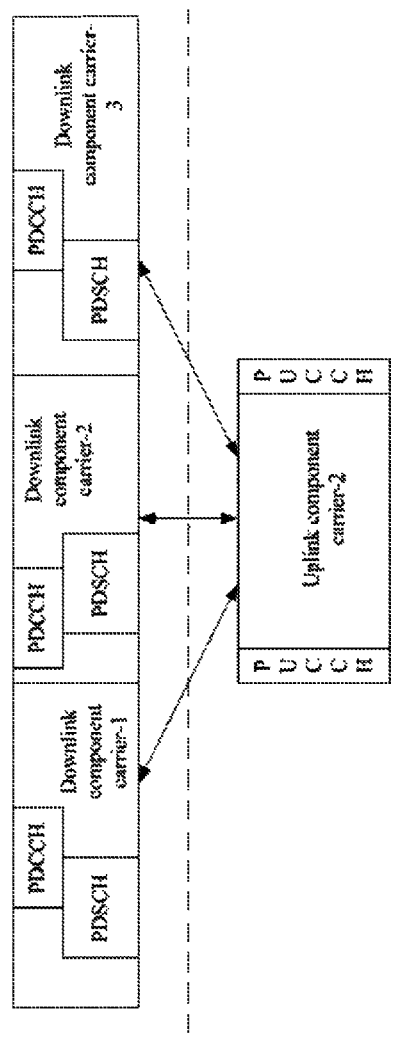
FIG. 3 is a schematic diagram of adopted uplink and downlink component carriers according to an embodiment of the present invention.

FIG. 3 is a schematic diagram of adopted uplink and downlink component carriers according to an embodiment of the present invention. As shown in FIG. 3, in the embodiment of the present invention, for a user equipment, it is assumed that the ACK/NACK information of PDSCHs transmitted over downlink component carrier-1, downlink component carrier-2, and downlink component carrier-3 are all fed back over uplink component carrier-2, where the PDSCH is used to transmit data, the PDCCH is used to transmit the scheduling information DCI of the PDSCH, and the PUCCH is the uplink ACK channel used to feed back the ACK/NACK information. In addition, among downlink component carrier-1, downlink component carrier-2, and downlink component carrier-3, only downlink component carrier-2 is a system-linked downlink component carrier of the uplink component carrier-2.

Figure 4:
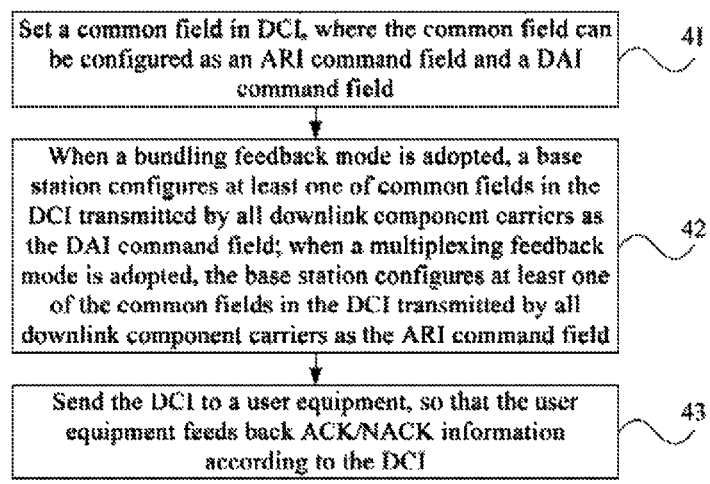
FIG. 4 is a schematic flowchart of a method according to a second embodiment of the present invention.

FIG. 4 is a schematic flowchart of a method according to a second embodiment of the present invention. This embodiment takes a TDD system for example. As shown in FIG. 4, the method includes.

Step 41: A base station sets a common field in DCI, where the common field can be configured as an ARI command field and a DAI command field.

For a non-system-linked downlink component carrier, an ARI command field needs to be used to indicate an assigned ACK channel resource. After the ARI command field is added in the DCI, the number of bits of the DCI definitely increases, which increases bit overheads and causes incompatibility with an LTE system. To reduce the bit overheads and accomplish better compatibility with the LTE system, in this embodiment, the common field is designed based on the existing DAI command field in the conventional DCI, so that the common field may be configured as a DAI command field or an ARI command field.

Because an LTE TDD system may support the ACK/NACK bundling feedback mode, the DCI in the TDD system includes the DAI command field. For compatibility with the LTE system, in a carrier aggregation LTE-A TDD system, the existing DAI command field may be used, and the DAI command field is set as a common field to represent not only the DAI command field but also the ARI command field. Therefore, when the DCI needs to include an ARI command field, no new field needs to be added in the DCI. Certainly, in the case of an FDD system, the common field may be set in a manner of newly adding 2 bits to represent the DAI command field or the ARI command field. Compared with the independent setting of both the DAI command field and the ARI command field where 4 bits are required, this also reduces the bit overheads.

Step 42: When the bundling feedback mode is adopted, the base station configures at least one of common fields in the DCI transmitted by all downlink component carriers as the DAI command field; when the multiplexing feedback mode is adopted, the base station configures at least one of common fields in the DCI transmitted by all downlink component carriers as the ARI command field.

Specifically, of all downlink component carriers, only the common field in the DCI transmitted by the primary downlink component carrier is configured as the DAI command field or ARI command field; or the common field in the DCI transmitted by other one or more downlink component carriers is configured as the DAI command field or ARI command field. That is, the DCI that includes a common field configured as the DAI command field or ARI command field may be transmitted over one or more multiple downlink component carriers, where the one downlink component carrier may be a primary component carrier or a non-primary component carrier.

Specifically, one downlink component carrier may transmit one piece of DCI or transmit multiple pieces of DCI. When the downlink component carrier transmits only one piece of DCI, the common field in the DCI is configured as the DAI command field or ARI command field. When the downlink component carrier transmits multiple pieces of DCI, the common field in one or more pieces of DCI is configured as the DAI command field or ARI command field.

Specifically, one or more common fields may be configured in the DCI.

For ease of design, when the bundling feedback mode is adopted, the base station may configure the common fields in the DCI transmitted by all downlink component carriers as the DAI command fields; when the multiplexing feedback mode is adopted, the base station may configure the common fields in the DCI transmitted by all downlink component carriers as the ARI command fields.

Taking FIG. 3 for example, the common fields in the DCI corresponding to downlink component carrier-1, downlink component carrier-2, and downlink component carrier-3 are all configured as the DAI command fields in the bundling feedback mode, and are all configured as the ARI command fields in the multiplexing feedback mode. The uplink ACK/NACK information feedback mode may be specific to a cell. That is, all user equipments in a cell adopt a same uplink ACK/NACK information feedback mode. Alternatively the uplink ACK/NACK information feedback mode may be specific to a user equipment. That is, different user equipment may adopt different uplink ACK/NACK information feedback modes.

Alternatively, when the bundling feedback mode is adopted, for example, the base station configures the common field in at least one piece of DCI transmitted by the downlink PCC (Primary Component Carrier, primary component carrier) and/or the common field in the DCI corresponding to the PDSCH transmission of the downlink PCC as the DAI command field; when the multiplexing feedback mode is adopted, for example, the base station configures the common field in at least one piece of DCI transmitted by the downlink PCC and/or the common field in the DCI corresponding to the PDSCH transmission of the downlink PCC as the ARI command field.

For a user equipment in a carrier aggregation mode, one downlink PCC and one uplink PCC may be defined. The downlink PCC may be used for radio link failure detection and system message updating of the user equipment, and after configured, the downlink PCC cannot be deactivated. The uplink PCC may be used by the user equipment to feed back uplink control information. Taking FIG. 3 for example, downlink component carrier-2 and uplink component carrier-2 may be respectively defined as the downlink PCC and uplink PCC of the user equipment.

When the bundling feedback mode is adopted, if the DAI command field is used to indicate the total number of PDCCHs that carry DCI at the moment, the base station may configure only the common fields in part of the DCI transmitted by the downlink PCC and/or the common field in the DCI corresponding to the PDSCH transmission of the downlink PCC as the DAI command fields, and configure the common field in other DCI as a preset default value to use the common field in other DCI for other purposes. When the multiplexing feedback mode is adopted, one ACK/NACK information feedback manner is to assign a different uplink ACK channel, for example, the PUCCH format 1a/1b channel, to the PDSCH transmission of each downlink component carrier, and feed back the ACK/NACK information over the selected uplink ACK channel through a preset approach. For ease of description, this manner is referred to as a channel selection manner. Another ACK/NACK information feedback manner is to assign a common uplink ACK channel, for example, the PUCCH format 2/2a/2b channel or a new format PUCCH channel, to the PDSCH transmission of all downlink component carriers, and feed back the jointly coded ACK/NACK information over the assigned uplink ACK channel. For ease of description, this manner is referred to as a joint coding manner. When the joint coding manner is adopted to feed back ACK/NACK information, because a common uplink ACK channel is assigned to the PDSCH transmission of all downlink component carriers, the base station may configure only the common fields in part of the DCI transmitted by the downlink PCC and/or the common field in the DCI corresponding to the PDSCH transmission of the downlink PCC as the ARI command fields, and configure the common field in other DCI as a preset default value or use the common field in other DCI for other purposes.

Step 43: The base station sends the DCI to a user equipment, so that the user equipment feeds back ACK/NACK information according to the DCI.

In this embodiment, a common field is designed based on the conventional DAI command field, where the common field may be configured as a DAI command field or an ARI command field, which realizes the representation of two pieces of information by using the existing command field that can only represent one piece of information without the need of an additional command field, and reduces the bit overheads and the complexity of design and implementation.

Figure 5:
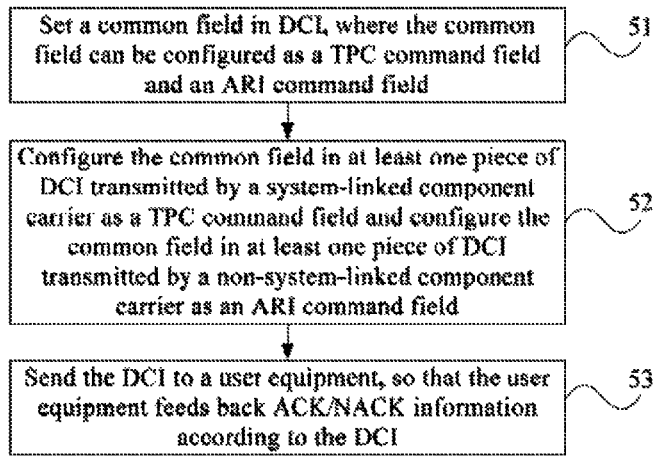
FIG. 5 is a schematic flowchart of a method according to a third embodiment of the present invention.

FIG. 5 is a schematic flowchart of a method according to a third embodiment of the present invention. This embodiment takes a TDD system or an FDD system for example. As shown in FIG. 5, the method includes:

Step 51: A base station sets a common field in DCI, where the common field can be configured as a TPC command field and an ARI command field.

Because the TPC command field is used to control power transmission, the TPC command field exists in both the TDD system and the FDD system. For compatibility with an LTE system, in a carrier aggregation LTE-A system, the existing TPC command field may be used, and the TPC command field may be set as a common field that may represent not only the TPC command field but also the ARI command field. In this way, when the DCI needs to include an ARI command field, no new field needs to be added in the DCI.

Step 52: The base station configures a common field in at least one piece of DCI transmitted by a system-linked downlink component carrier as a TPC command field; and configures a common field in at least one piece of DCI transmitted by a non-system-linked downlink component carrier as an ARI command field.

Specifically, for one user equipment, when ACK/NACK information corresponding to PDSCHs transmitted by $N_{DL}$ downlink component carriers is configured to be fed back over one uplink component carrier, the system-linked downlink component carrier of the uplink component carrier may possibly transmit n PDCCHs simultaneously, where $1 \leq n \leq N_{DL}$ and the n PDCCHs respectively carry the DCI information for scheduling PDSCH transmission of n downlink component carriers. The case that n is greater than 1 is possibly caused by the following two factors: in the $N_{DL}$ downlink component carriers, there are at least two system-linked downlink component carriers of the uplink component carrier; and the PDCCH performs cross-carrier scheduling on the PDSCH transmission of other carriers. There is one common field respectively in the DCI carried by the n PDCCHs.

In step 52, the base station configures the common field in at least one piece of DCI transmitted by the system-linked downlink component carrier as the TPC command field, where the at least one piece of DCI transmitted by the system-linked downlink component carrier may be the DCI corresponding to the PDSCH transmission of the downlink PCC and/or at least one piece of DCI transmitted by the downlink PCC.

In step 52, the base station configures the common field in at least one piece of DCI transmitted by the non-system-linked downlink component carrier as the ARI command field. The configuring the common field in at least one piece of DCI transmitted by the non-system-linked downlink component carrier as the ARI command field may Specifically be: configuring the common field in the DCI transmitted by the non-system-linked downlink component carrier as the ARI command field, for example, when the ACK/NACK information is fed back in a channel selection manner or joint coding manner; or configuring the common field in a piece of pre-designated DCI transmitted by the non-system-linked downlink component carrier as the ARI command field, where, for example, when the ACK/NACK information is fed back in the joint coding manner, the pre-designated DCI may specifically be DCI which is transmitted first or last by the non-system-linked downlink component carrier and corresponds to the PDSCH transmission of a downlink non-PCC in the activated downlink component carriers. In this step, the at least one piece of DCI transmitted by the non-system-linked downlink component carrier may be one or more pieces of DCI transmitted over one of the non-system-linked downlink component carriers, or one or more pieces of DCI transmitted over multiple carriers.

Taking FIG. 3 for example, the common field in the DCI corresponding to downlink component carrier-2 is configured as the TPC command field, and the common fields in the DCI corresponding to downlink component carrier-1 and downlink component carrier-3 are configured as the ARI command fields; or the common field in the DCI corresponding to downlink component carrier-2 is configured as the TPC command field, and the common field in pre-designated DCI is configured as the ARI command field, where the DCI corresponding to downlink component carrier-3 is the pre-designated DCI.

Step 53: The base station sends the DCI to a user equipment, so that the user equipment feeds back ACK/NACK information according to the DCI.

In this embodiment, the base station assigns ACK channel resources for the user equipment in the following manner: An uplink ACK channel resource for implicit mapping is reserved in one uplink component carrier for each PDCCH transmitted over the system-linked downlink component carrier of the uplink component carrier. Therefore, the uplink ACK channel resource assigned to the PDSCH transmission of sending a corresponding PDCCH over the system-linked downlink component carrier may be obtained through implicit mapping from the corresponding PDCCH; the uplink ACK channel assigned to the PDSCH transmission of sending the corresponding PDCCH over the non-system-linked downlink component carrier cannot be obtained through implicit mapping from the corresponding PDCCH, but may be obtained in an explicit signaling notification manner. In this case, for the PDSCH transmission of each downlink component carrier, if the corresponding PDCCH may be sent over a non-system-linked downlink component carrier, the base station assigns a group of uplink ACK channel resources through high-level signaling. The group of uplink ACK channel resources assigned through high-level signaling may be different or the same for the PDSCH transmission of different component carriers. The common fields in the DCI carried by the PDCCHs sent over the system-linked downlink component carrier may all be configured as the TPC command fields; the common fields carried by the PDCCHs sent over the non-system-linked downlink component carrier may all be configured as the ARI command fields.

Figure 5A:
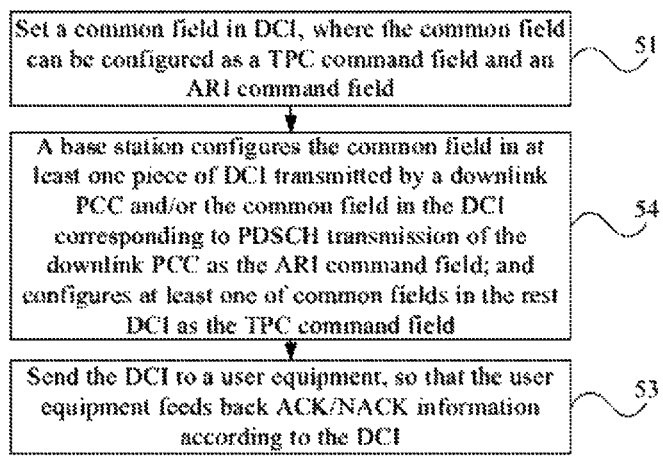
FIG. 5a is a schematic flowchart of a method according to a third embodiment of the present invention.

In addition, as shown in FIG. 5a, this embodiment may further include:

Step 51: The base station sets a common field in the DCI, where the common field can be configured as a TPC command field and an ARI command field.

Step 54: The base station configures the common field in at least one piece of DCI transmitted by the downlink PCC and/or the common field in the DCI corresponding to the PDSCH transmission of the downlink PCC as the ARI command field; and configures at least one of common fields in the rest DCI as the TPC command field.

Specifically, when the joint coding manner is adopted to feed back ACK/NACK information, because a common uplink ACK channel is assigned to the PDSCH transmission of all downlink component carriers, the base station may configure only the common field in at least one piece of DCI transmitted by the downlink PCC and/or the common field in the DCI corresponding to the PDSCH transmission of the downlink PCC as the ARI command field; configure the at least one of common fields in the rest DCI as the TPC command field; and configure the common field in other DCI as a preset default value or use the common field in other DCI for other purposes.

Taking FIG. 3 for example, downlink component carrier-2 is a downlink PCC and downlink component carrier-3 is a downlink non-PCC. In this case, the common field in the DCI corresponding to downlink component carrier-2 may be configured as the ARI command field, the common field in the DCI corresponding to downlink component carrier-3 may be configured as the TPC command field, and the common field in the DCI corresponding to downlink component carrier-1 may be configured as a preset default value.

Step 53: The base station sends the DCI to a user equipment, so that the user equipment feeds back ACK/NACK information according to the DCI.

That is, in this embodiment and the fourth and fifth embodiments, the common field in at least one piece of DCI transmitted by a system-linked downlink component carrier, for example, the downlink PCC, may be configured as the DAI command field and/or the ARI command field, and the common field in at least one piece of DCI transmitted by a non-system-linked downlink component carrier, for example, a downlink non-PCC, may be configured as the TPC command field. Reference and applications may be made in other cases.

In this embodiment, a common field is designed based on the conventional TPC command field, where the common field may be configured as a TPC command field or ARI command field, which realizes the representation of two pieces of information by using the existing command field that can only represent one piece of information without the need of an additional command field, and reduces the bit overheads and the complexity of design and implementation.

Figure 6:
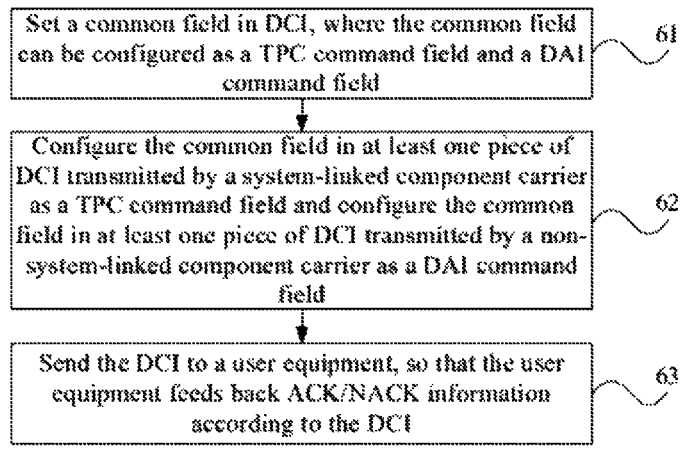
FIG. 6 is a schematic flowchart of a method according to a fourth embodiment of the present invention.

FIG. 6 is a schematic flowchart of a method according to a fourth embodiment of the present invention. This embodiment takes an FDD system for example. As shown in FIG. 6, the method includes:

Step 61: A base station sets a common field in DCI, where the common field can be configured as a TPC command field and a DAI command field.

Step 62: The base station configures the common field in at least one piece of DCI transmitted by a system-linked downlink component carrier as a TPC command field; and configures the common field in at least one piece of DCI transmitted by a non-system-linked downlink component carrier as a DAI command field.

The at least one piece of DCI transmitted by the system-linked downlink component carrier may specifically be the DCI corresponding to the PDSCH transmission of a downlink PCC and/or at least one piece of DCI transmitted by the downlink PCC. The configuring the common field in the at least one piece of DCI transmitted by a non-system-linked downlink component carrier as the DAI command field may specifically be, for example, configuring the common fields in the DCI transmitted by the non-system-linked downlink component carrier as the DAI command field; or configuring the common field in one piece of pre-designated DCI transmitted by the non-system-linked downlink component carrier as the DAI command field. The one piece of pre-designated DCI may specifically be, for example, DCI which is transmitted first or last by the non-system-linked downlink component carrier and corresponds to the PDSCH transmission of a downlink non-PCC among activated downlink component carriers.

Specifically, for one user equipment, when ACK/NACK information corresponding to the PDSCHs transmitted by $N_{DL}$ downlink component carriers is configured to be fed back over one uplink component carrier, the system-linked downlink component carrier of the uplink component carrier may possibly transmit n PDCCHs simultaneously, where $1 \leq n \leq N_{DL}$ and the n PDCCHs respectively carry the DCI for scheduling PDSCH transmission of n downlink component carriers. The case that n is greater than 1 is possibly caused by the following two factors: in the $N_{DL}$ downlink component carriers, there are at least two system-linked downlink component carriers of the uplink component carrier; and the PDCCH performs cross-carrier scheduling on the PDSCH transmission of other carriers. There is one common field respectively in the DCI carried by the n PDCCHs.

Taking FIG. 3 for example, the common field in the DCI corresponding to downlink component carrier-2 is configured as the TPC command field, and the common fields in the DCI corresponding to downlink component carrier-1 and downlink component carrier-3 are configured as the DAI command fields.

Step 63: The base station sends the DCI to a user equipment, so that the user equipment feeds back ACK/NACK information according to the DCI.

In this embodiment, the base station assigns ACK channel resources to the user equipment in the following manner: An uplink ACK channel resource for implicit mapping is reserved in one uplink component carrier for each PDCCH transmitted over the system-linked downlink component carrier of the uplink component carrier. Therefore, for the PDSCH transmission of sending a corresponding PDCCH over the system-linked downlink component carrier, the assigned uplink ACK channel resource may be obtained through implicit mapping from the corresponding PDCCH. The common fields carried by n PDCCHs transmitted over the system-linked downlink component carrier may all be parsed as the TPC command fields; or only one PDCCH may be selected, for example, the first PDCCH or a pre-designated PDCCH transmitted by a system-linked downlink component carrier, and the common field carried by the selected PDCCH can be configured as the TPC command field while the common fields carried by the rest n−1 PDCCHs are all configured as the DAI command field.

As described above, the DAI command field is used to indicate the number of PDCCHs that carry DCI and is mainly used when the uplink ACK/NACK information is in the bundling feedback mode. In the bundling feedback mode, the uplink ACK/NACK information corresponding to multiple PDSCH transmissions is fed back together through logic AND operation, which requires only one uplink ACK channel. Therefore, for PDSCH transmission of send a corresponding PDCCH over the non-system-linked downlink component carrier, the uplink ACK channel resource may not be assigned; in this case, only the DAI command field is required to be used to indicate the total number of PDCCHs that are used to carry DCI at the current moment. Taking the configuration shown in FIG. 3 for example, suppose that the corresponding PDCCH that schedules the PDSCH transmission of each downlink component carrier is sent over the downlink component carrier itself, and then an uplink ACK channel is assigned to the user equipment through implicit mapping from the PDCCH sent over downlink component carrier-2 and no uplink ACK channel is assigned for the PDSCH transmission over downlink component carrier-1 and downlink component carrier-3. If the user equipment receives the PDCCH sent over downlink component carrier-2 successfully, and meanwhile, receives the PDCCHs sent over downlink component carrier-1 and downlink component carrier-3 incorrectly, because the common field in the PDCCHs received by the user equipment is not the DAI command field, the user equipment cannot detect loss of PDCCHs, which causes an incorrect uplink ACK/NACK information feedback. The channel condition of a user equipment configured in the ACK/NACK bundling feedback mode is usually poor. Therefore, the number of control channel unit resources occupied by a PDCCH may be always constrained to be more than one. This may be guaranteed by keeping sending more than one PDCCH is over a system-linked downlink component carrier or the PDCCH sent by a system-linked downlink component carrier occupies resources of more than one control channel unit. In the process of implicit mapping of uplink ACK channels from PDCCHs, one uplink ACK channel can be mapped from each control channel unit. When a PDCCH occupies more than one control channel unit resource, the number of uplink ACK channels that can be mapped implicitly from the PDCCH sent over a system-linked downlink component carrier is also more than one. In this case, two uplink ACK channels may be selected, for example, the two uplink ACK channels mapped from the first two control channel units occupied by the PDCCH, where the two selected uplink ACK channels are marked as ACK0 and ACK1. To avoid the possible incorrect uplink ACK/NACK information feedback caused by not receiving a PDCCH that includes a common field which can be configured as a DAI command field, ACK0 may be selected to feed back uplink ACK/NACK information when none of the common fields in the successfully received PDCCHs can be configured as the DAI command field, and ACK1 may be selected to feed back uplink ACK/NACK information when a common field in the successfully received PDCCHs is configured as the DAI command field.

However, for a user equipment configured in the bundling mode, it may possibly cause unnecessary waste of PDCCH resources that the number of the control channel units occupied by a PDCCH is always constrained to be more than one. For PDSCH transmission of sending a corresponding PDCCH over the non-system-linked downlink component carrier, an uplink ACK channel resource may be assigned in an explicit signaling notification manner. In this case, one uplink ACK channel resource may be assigned to one user equipment directly through high-level signaling; or one group of uplink ACK channel resources are assigned through high-level signaling, and one default uplink ACK channel resource, for example, the first uplink ACK channel resource, is selected when the user equipment is in the bundling feedback mode. When one group of uplink ACK channel resources are assigned through high-level signaling, a manner in which one group of uplink ACK channel resources is assigned through high-level signaling in the multiplexing feedback mode may be adopted so as to keep a simple system design. In addition, when one default uplink ACK channel resource is selected from a group of assigned uplink ACK channel resources, different user equipment may select different default uplink ACK channels. For example, UE-1 selects by default the first uplink ACK channel resource assigned through high-level signaling when in the bundling feedback mode and UE-2 selects by default the last uplink ACK channel resource assigned through high-level signaling when in the bundling feedback mode. Mark an uplink ACK channel assigned implicitly as $ACK_{imp}$ and an uplink ACK channel assigned explicitly as $ACK_{exp}$. To avoid the possible incorrect uplink ACK/NACK information feedback caused by not receiving a PDCCH that includes a common field which can be configured as a DAI command field, $ACK_{imp}$ may be selected to feed back uplink ACK/NACK information when none of the common fields in the successfully received PDCCHs can be configured as the DAI command field, and $ACK_{exp}$ may be selected to feed back uplink ACK/NACK information when a common field in the successfully received PDCCHs is configured as the DAI command field.

In this embodiment, a common field may be configured as a TPC command field and a DAI command field. and the UE may determine the assigned first ACK/NACK channel; after correctly receiving the first DCI, the UE feeds back the ACK/NACK information through the determined first ACK/NACK channel, where the first DCI is DCI with a common field configured as a DAI command field, and the first ACK/NACK channel is dedicated to feed back the ACK/NACK information when the first DCI is correctly received. The first ACK/NACK channel may be determined through an implicit rule or notified through high-level signaling. When the first ACK/NACK channel is determined according to a high-level signaling notification, a group of ACK/NACK channels may be notified through the high-level signaling and the user equipment selects one or more ACK/NACK channels from the group of ACK/NACK channels or the user equipment uses all ACK/NACK channels notified through high-level signaling.

In this embodiment, a common field may be configured as a TPC command field and a DAI command field, and the UE may determine the assigned second ACK/NACK channel and when the first DCI is not correctly received, the UE feeds back the ACK/NACK information through the determined second ACK/NACK channel, where the second ACK/NACK channel is dedicated to feed back the ACK/NACK information when the first DCI is not correctly received. The second ACK/NACK channel may be determined through an implicit rule or notified through high-level signaling. When the second ACK/NACK channel is determined according to a high-level signaling notification, a group of ACK/NACK channels may be notified through the high-level signaling and the user equipment selects one or more ACK/NACK channels from the group or the user equipment uses all ACK/NACK channels notified through the high-level signaling.

In this embodiment, a common field is designed based on the conventional TPC command field, where the common field may be configured as a TPC command field or DAI command field, which realizes the representation of two pieces of information by using the existing command field that can only represent one piece of information without the need of an additional command field, and reduces the bit overheads and the complexity of design and implementation.

Figure 7:
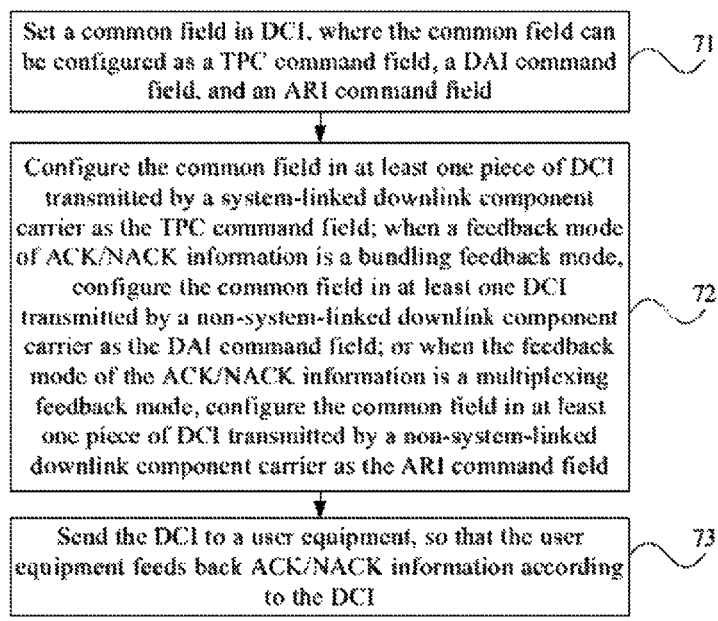
FIG. 7 is a schematic flowchart of a method according to a fifth embodiment of the present invention.

FIG. 7 is a schematic flowchart of a method according to a fifth embodiment of the present invention. This embodiment takes an FDD system for example. As shown in FIG. 7, the method includes.

Step 71: A base station sets a common field in DCI, where the common field can be configured as a TPC command field, a DAI command field, and an ARI command field.

Step 72: The base station configures the common field in at least one piece of DCI transmitted by a system-linked downlink component carrier as the TPC command field; when the feedback mode of ACK/NACK information is a bundling feedback mode, the base station configures the common field in at least one piece of DCI transmitted by a non-system-linked downlink component carrier as the DAI command field; or when the feedback mode of the ACK/NACK information is a multiplexing feedback mode, the base station configures the common field in at least one piece of DCI transmitted by the non-system-linked downlink component carrier as the ARI command field The at least one piece of DCI transmitted by the system-linked downlink component carrier may specifically be the DCI corresponding to PDSCH transmission of a downlink PCC and/or at least one piece of DCI transmitted by the downlink PCC. When the feedback mode of the ACK/NACK information is the bundling feedback mode, the configuring the common field in at least one piece of DCI transmitted by the non-system-linked downlink component carrier as the DAI command field may be, for example, configuring the common fields in the DCI transmitted by the non-system-linked downlink component carrier as the DAI command fields; or configuring the common field in a pre-designated DCI transmitted by the non-system-linked downlink component carrier as the DAI command field. When the feedback mode of the ACK/NACK information is the multiplexing feedback mode, the configuring the common field in at least one piece of DCI transmitted by the non-system-linked downlink component carrier as the ARI command field may be, for example, configuring the common fields in the DCI transmitted by the non-system-linked downlink component carrier as the ARI command field; or configuring the common field in one piece of pre-designated DCI transmitted by the non-system-linked downlink component carrier as the ARI command field. The one piece of pre-designated DCI may specifically be DCI which is transmitted first or last by the non-system-linked downlink component carrier and corresponds to the PDSCH transmission of a downlink non-PCC among activated downlink component carriers.

Specifically, for one user equipment, when the ACK/NACK information corresponding to the PDSCHs transmitted by $N_{DL}$ downlink component carriers is configured to be fed back over one uplink component carrier, the system-linked downlink component carrier of the uplink component carrier may possibly transmit n PDCCHs simultaneously, where $1 \leq n \leq N_{DL}$ and the n PDCCHs respectively carry the DCI information for scheduling PDSCH transmission of n downlink component carriers. The case that n is greater than 1 is possibly caused by the following two factors: in the $N_{DL}$ downlink component carriers, there are at least two system-linked downlink component carriers of the uplink component carrier, and the PDCCH performs cross-carrier scheduling on the PDSCH transmission of other carriers. There is one common field respectively in the DCI information carried by the n PDCCHs.

Taking FIG. 3 for example, the common field corresponding to downlink component carrier-2 is configured as the TPC command field; in the bundling feedback mode, the common fields corresponding to downlink component carrier-1 and downlink component carrier-3 are both configured as the DAI command fields; and in the multiplexing feedback mode, the common fields corresponding to downlink component carrier-1 and downlink component carrier-3 are both configured as the ARI command fields.

Step 73: The base station sends the DCI to a user equipment, so that the user equipment feeds back ACK/NACK information according to the DCI.

In this embodiment, the base station may assign ACK channel resources to the user equipment in the following manner: when the feedback mode of the ACK/NACK information is the multiplexing feedback mode, reference may be made to the embodiment shown in FIG. 5 for assignment when the feedback mode of the ACK/NACK information is the bundling feedback mode, reference may be made to the embodiment shown in FIG. 6 for assignment.

In this embodiment, the common field may be configured as the TPC command field, the DAI command field, and the ARI command field. When the feedback mode of the ACK/NACK is the bundling feedback mode, the UE may determine an assigned first ACK/NACK channel; and when receiving the first DCI correctly, the user equipment feeds back the ACK/NACK information through the determined first ACK/NACK channel, where the first DCI is DCI with a common field configured as the DAI command field, and the first ACK/NACK channel is dedicated to feed back the ACK/NACK information when the first DCI is correctly received. The first ACK/NACK channel may be determined through an implicit rule or notified through high-level signaling. When the first ACK/NACK channel is determined according to a high-level signaling notification, a group of ACK/NACK channels may be notified through the high-level signaling, and the user equipment selects one or more ACK/NACK channels from the group; or the user equipment uses all ACK/NACK channels notified through the high-level signaling.

In this embodiment, the common field may be configured as the TPC command field, the DAI command field, and the ARI command field. When the feedback mode of the ACK/NACK information is the bundling feedback mode, the UE may determine an assigned second ACK/NACK channel; and if the first DCI is not correctly received, the UE feeds back the ACK/NACK information through the determined second ACK/NACK channel, where the second ACK/NACK channel is dedicated to feed back the ACK/NACK information when the first DCI is not correctly received. The second ACK/NACK channel may be determined through an implicit rule or notified through high-level signaling. When the second ACK/NACK channel is determined according to a high-level signaling notification, a group of ACK/NACK channels may be notified through the high-level signaling, and the user equipment selects one or more ACK/NACK channels from the group; or the user equipment uses all ACK/NACK channels notified through the high-level signaling.

In this embodiment, a common field is designed based on the existing TPC command field, where the common field may be configured as a TPC command field, a DAI command field, or an ARI command field, which realizes the representation of three pieces of information by using the existing command field that can only represent one piece of information without the need of additional command fields, and reduces the bit overhead and the complexity of design and implementation.

Note that in the first to the fifth embodiments of the present invention, for the data transmission of the downlink component carrier, the corresponding ACK/NACK information feedback is controlled according to the common field in the DCI. For the data transmission scheduled semi-statically on the downlink component carrier, the initial transmission is not controlled through the DCI, and the feedback of ACK/NACK information may reutilize the LTE system mechanism, which is beyond the discussion scope of the present invention. In an LTE-A system, some multi-antenna technologies, for example, transmit diversity or space division multiplexing, may be introduced for the feedback of uplink ACK/NACK information; in this case, the data transmission of one downlink component carrier may require the assignment of two or more uplink ACK channels. In an example in which the data transmission of one downlink component carrier requires assignment of two uplink ACK channels, the second ACK channel may be obtained by adding a fixed offset to the assigned first ACK channel; or in the case that the uplink ACK channel is assigned through implicit mapping from the PDCCH, each PDCCH occupies at least two control channel unit resources, and in the case that the uplink ACK channels is assigned through an explicit signaling notification, a group of uplink ACK channel resource pairs may be configured directly through high-level signaling, and the ARI command field in the DCI indicates the currently assigned uplink ACK channel resource pair. This is not the focus of the present invention, and is not further described here.

Figure 8:
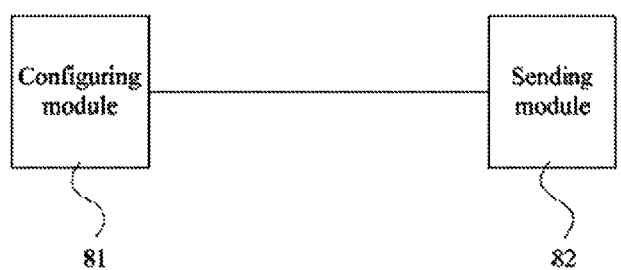
FIG. 8 is a schematic structural diagram of a base station according to a sixth embodiment of the present invention.

FIG. 8 is a schematic structural diagram of a base station according to a sixth embodiment of the present invention, where the base station includes a configuring module 81 and a sending module 82. The configuring module 81 is configured to configure a common field preset in DCI as at least one type of command field related to ACK/NACK feedback of at least two types of command fields related to ACK/NACK feedback, where the common field can be configured as the command fields related to ACK/NACK feedback. The sending module 82 is configured to send the DCI to a user equipment, so that the user equipment feeds back ACK/NACK information according to the DCI.

Further, the base station in this embodiment may include a setting module, where the setting module is configured to set the common field in the DCI.

The common field may be configured as a DAI command field and an ARI command field. In this case, the configuring module 81 includes a first unit or a second unit. The first unit is configured to configure at least one common field as the DAI command field when the feedback mode of the ACK/NACK information is a bundling feedback mode, for example, to configure all common fields as the DAI command fields or configure the common field in at least one piece of DCI transmitted by a downlink PCC and/or the common field in the DCI corresponding to the PDSCH transmission of the downlink PCC as the DAI command field. The second unit is configured to configure at least one common field as the ARI command field when the feedback mode of the ACK/NACK information is a multiplexing feedback mode, for example, to configure all common fields as the ARI command fields or configure the common field in at least one piece of DCI transmitted by the downlink PCC and/or the common field in the DCI corresponding to the PDSCH transmission of the downlink PCC as the ARI command field.

Alternatively, the common field may be configured as a TPC command field and an ARI command field. In this case, the configuring module 81 includes a third unit and a fourth unit. The third unit is configured to configure the common field in at least one piece of DCI transmitted by a system-linked downlink component carrier as the TPC command field, for example, specifically configured to configure the common field in the DCI corresponding to the PDSCH transmission of the downlink PCC and/or the common field in at least one piece of DCI transmitted by the downlink PCC as the TPC command field. The fourth unit is configured to configure the common field in at least one piece of DCI transmitted by a non-system-linked downlink component carrier as the ARI command field, for example, specifically configured to configure all common fields in the DCI transmitted by the non-system-linked downlink component carrier as the ARI command fields, or configure the common field in one piece of pre-designated DCI transmitted by the non-system-linked downlink component carrier as the ARI command field.

Alternatively, the third unit is configured to configure the common field in at least one piece of DCI transmitted by the non-system-linked downlink component carrier as the TPC command field; and the fourth unit is configured to configure the common field in at least one piece of DCI transmitted by the system-linked downlink component carrier as the ARI command field.

Alternatively, the common field may be configured as a TPC command field and a DAI command field. In this case, the configuring module 81 includes a fifth unit and a sixth unit. The fifth unit is configured to configure the common field in at least one piece of DCI transmitted by the system-linked downlink component carrier as the TPC command field, for example, specifically configured to configure the common field in the DCI corresponding to the PDSCH transmission of the downlink PCC and/or the common field in at least one piece of DCI transmitted by the downlink PCC as the TPC command field. The sixth unit is configured to configure the common field in at least one piece of DCI transmitted by the non-system-linked downlink component carrier as the DAI command field, for example, specifically configured to configure all common fields in the DCI transmitted by the non-system-linked downlink component carrier as the DAI command fields, or configure the common field in one piece of pre-designated DCI transmitted by the non-system-linked downlink component carrier as the DAI command field.

Alternatively, the fifth unit is configured to configure the common field in at least one piece of DCI transmitted by the non-system-linked downlink component carrier as the TPC command field; and the sixth unit is configured to configure the common field in at least one piece of DCI transmitted by the system-linked downlink component carrier as the DAI command field.

Alternatively, the common field may be configured as a TPC command field, and a DAI command field, and an ARI command field. In this case, the configuring module 81 includes a seventh unit and an eighth unit. The seventh unit is configured to configure the common field in at least one piece of DCI transmitted by the system-linked downlink component carrier as the TPC command field, for example, specifically configured to configure the common field in the DCI corresponding to the PDSCH transmission of the downlink PCC and/or the common field in at least one piece of DCI transmitted by the downlink PCC as the TPC command field. The eighth unit is configured to configure the common field in at least one piece of DCI transmitted by the non-system-linked downlink component carrier as the DAI command field when the feedback mode of the ACK/NACK information is the bundling feedback mode, for example, specifically configured to configure all common fields in the DCI transmitted by the non-system-linked downlink component carrier as the DAI command fields or configure the common field in one piece of pre-designated DCI transmitted by the non-system-linked downlink component carrier as the DAI command field; or the eighth unit is configured to configure the common field in at least one piece of DCI transmitted by the non-system-linked downlink component carrier as the ARI command field when the feedback mode of the ACK/NACK information is the multiplexing feedback mode, for example, specifically configured to configure all common fields in the DCI transmitted by the non-system-linked downlink component carrier as the ARI command fields or configure the common field in one piece of pre-designated DCI transmitted by the non-system-linked downlink component carrier as the ARI command field.

Alternatively the seventh unit is configured to configure the common field in at least one piece of DCI transmitted by the non-system-linked downlink component carrier as the TPC command field; and the eighth unit is configured to configure the common field in at least one piece of DCI transmitted by the system-linked downlink component carrier as the DAI command field when the feedback mode of the ACK/NACK information is the bundling feedback mode, or configured to configure the common field in at least one piece of DCI transmitted by the system-linked downlink component carrier as the ARI command field when the feedback mode of the ACK/NACK information is the multiplexing feedback mode.

For the specific functions performed by the foregoing modules, reference may be made to the method embodiments, which are not repeatedly described here. The base station provided in this embodiment may, for example, execute the methods provided in the foregoing method embodiments.

In this embodiment, a common field is set in the DCI and the common field may be configured as different command fields in different scenarios. Therefore, from the perspective of effectiveness, the common field is equivalent to the sum of command fields that the common field may be configured as, which realizes the representation of more command fields by using a smaller number of bits, and reduces the bit overheads and the complexity of design and implementation. Therefore, the number of bits of the DCI information in the LTE-A system is kept consistent with that in the LTE system as much as possible to achieve compatibility with the LTE system, so that most design in the LTE system is passed down to the LTE-A system.

Figure 9:
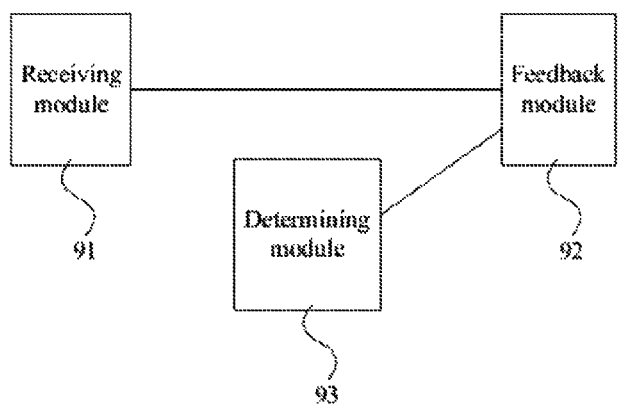
FIG. 9 is a schematic structural diagram of a user equipment according to a seventh embodiment of the present invention.

FIG. 9 is a schematic structural diagram of a user equipment according to a seventh embodiment of the present invention, where the user equipment includes a receiving module 91 and a feedback module 92. The receiving module 91 is configured to receive DCI which is sent by a base station and transmitted by a downlink component carrier. The feedback module 92 is configured to feed back ACK/NACK information according to a command field which is related to ACK/NACK feedback and configured in a common field preset in the DCI, where the common field can be configured as at least two types of command fields related to ACK/NACK feedback.

The at least two types of command fields related to ACK/NACK feedback, where the common field can be configured as the command fields related to ACK/NACK feedback, may be a DAI command field and an ARI command field; or a TPC command field and an ARI command field; or a TPC command field and a DAI command field; or a TPC command field, a DAI command field, and an ARI command field.

In this embodiment, the common field may be configured as the TPC command field and the DAI command field, or be configured as the TPC command field, DAI command field, and ARI command field, and when the feedback mode of the ACK/NACK information is the bundling feedback mode, the user equipment may further include a determining module 93. The determining module 93 is configured to determine an assigned first ACK/NACK channel; and the feedback module 92 is specifically configured to feed back ACK/NACK information through the first ACK/NACK channel determined by the determining module 93, when a first DCI is correctly received. In this embodiment, the first DCI is DCI with a common field configured as the DAI command field; and the first ACK/NACK channel is dedicated to feed back the ACK/NACK information when the first DCI is correctly received.

In this embodiment, the determining module 93 may further be configured to determine a second ACK/NACK channel. The feedback module 92 is specifically configured to feed back ACK/NACK information through the second ACK/NACK channel determined by the determining module 93, when the first DCI is not correctly received. In this embodiment, the second ACK/NACK channel is dedicated to feed back the ACK/NACK information when the first DCI is not correctly received.

For the specific functions executed by the foregoing modules, reference may be made to the method embodiments, which are not repeatedly described here. The user equipment provided in this embodiment may, for example, execute the methods provided in the foregoing method embodiments.

In this embodiment, a common field is set in the DCI and the common field may be configured as different command field in different scenarios. Therefore, from the perspective of effectiveness, the common field is equivalent to the sum of command fields that the common field may be configured as, which realizes the representation of more command fields with a smaller number of bits, and reduces the bit overhead and the complexity of design and implementation. Therefore, the number of bits of the DCI information in the LTE-A system is kept consistent with that in the LTE system as much as possible to achieve compatibility with the LTE system, so that most design in the LTE system is passed down to the LTE-A system.

Those of ordinary skill in the art may understand that all or part of the steps in the foregoing method embodiments may be implemented through a program instructing relevant hardware. The program may be stored in a computer readable storage medium and when the program is run, the steps in the foregoing method embodiments are performed. The foregoing storage medium includes any medium that may store program codes, such as an ROM, an RAM, a magnetic disc, or a compact disc.

It may be understandable that the illustrations in the accompanying drawings or the description in the embodiments are schematic only and represent logic structures, where modules displayed or described as separate parts may be or may not be physically separated, parts displayed or described as modules may be or may not be physical units, which means that they may be located in one place or distributed in several network entities.

Finally, it should be noted that, the foregoing embodiments are merely used to describe instead of to limit the technical solutions of the present invention; although the present invention has been described in detail with reference to the foregoing embodiments, those of ordinary skill in the art should understand that: they may still make modifications to the technical solutions described in the foregoing embodiments or make equivalent replacements to part of the technical characteristics of the technical solutions; however, all these modifications and replacements do not make the corresponding technical solutions depart from the spirit and scope of the technical solutions in the embodiments of the present invention.

What is claimed is:

1. A method for feeding back Acknowledgement/Negative-acknowledgement (ACK/NACK) information for carrier aggregation, the method comprising:
configuring a common field preset in Downlink Control Information (DCI) as one of a transmission power control (TPC) command and an ACK resource indication (ARI) command, wherein the configuring comprises configuring the common field in at least one piece of DCI transmitted by a downlink primary component carrier or a system-linked downlink component carrier as the TPC command, and configuring the common field in at least one piece of DCI transmitted by a downlink non-primary component carrier or a non-system-linked downlink component carrier as the ARI command; and
sending the DCI to a user equipment.

2. The method according to claim 1, wherein the at least one piece of DCI transmitted by the downlink primary component carrier comprises DCI corresponding to physical downlink shared channel (PDSCH) transmission of the downlink primary component carrier.

3. The method according to claim 1, wherein the common field is a TPC command field.

4. The method according to claim 1, wherein the configuring comprises configuring the common field in at least one piece of DCI transmitted by a downlink primary component carrier as the TPC command, and configuring the common field in at least one piece of DCI transmitted by a downlink non-primary component carrier as the ARI command.

5. The method according to claim 4, wherein the at least one piece of DCI transmitted by the downlink primary component carrier comprises DCI corresponding to physical downlink shared channel (PDSCH) transmission of the downlink primary component carrier.

6. The method according to claim 4, wherein the common field is a TPC command field.

7. The method according to claim 1, wherein the configuring comprises configuring the common field in at least one piece of DCI transmitted by a system-linked downlink component carrier as the TPC command, and configuring the common field in at least one piece of DCI transmitted by a non-system-linked downlink component carrier as the ARI command.

8. A method for feeding back Acknowledgement/Negative-acknowledgement (ACK/NACK) information for carrier aggregation, the method comprising:
receiving downlink control information (DCI) that is sent by a base station and transmitted by a downlink component carrier, wherein a common field preset in the DCI is configured as one of a transmission power control (TPC) command and an ACK resource indication (ARI) command, wherein the common field in at least one piece of the DCI transmitted by a downlink primary component carrier is configured as the TPC command, and the common field in at least one piece of the DCI transmitted by a downlink non-primary component carrier is configured as the ARI command; and
feeding back ACK/NACK information according to the common field in at least one piece of the DCI.

9. The method according to claim 8, wherein the at least one piece of the DCI transmitted by the downlink primary component carrier comprises DCI corresponding to physical downlink shared channel (PDSCH) transmission of the downlink primary component carrier.

10. The method according to claim 8, wherein the common field is a TPC command field.

11. A base station, comprising:
a configuring module, configured to configure a common field preset in a downlink control information (DCI) as one of a transmission power control (TPC) command and an ACK resource indication (ARI) command, wherein the configuring module is configured to configure the common field in at least one piece of DCI transmitted by a downlink primary component carrier or a system-linked downlink component carrier as the TPC command, and to configure the common field in at least one piece of DCI transmitted by a downlink non-primary component carrier or a non-system-linked downlink component carrier as the ARI command; and
a sending module, configured to send the DCI to a user equipment.

12. The base station according to claim 11, wherein the at least one piece of DCI transmitted by the downlink primary component carrier comprises DCI corresponding to physical downlink shared channel (PDSCH) transmission of the downlink primary component carrier.

13. The base station according to claim 11, wherein the common field is a TPC command field.

14. The base station according to claim 11, wherein the configuring module is configured to configure the common field in at least one piece of DCI transmitted by a downlink primary component carrier as the TPC command, and to configure the common field in at least one piece of DCI transmitted by a downlink non-primary component carrier as the ARI command.

15. The base station according to claim 14, wherein the at least one piece of DCI transmitted by the downlink primary component carrier comprises DCI corresponding to physical downlink shared channel (PDSCH) transmission of the downlink primary component carrier.

16. The base station according to claim 14, wherein the common field is a TPC command field.

17. The base station according to claim 11, wherein the configuring module is configured to configure the common field in at least one piece of DCI transmitted by a system-linked downlink component carrier as the TPC command, and to configure the common field in at least one piece of DCI transmitted by a non-system-linked downlink component carrier as the ARI command.

18. A user equipment, comprising:
a receiving module, configured to receive downlink control information (DCI) that is sent by a base station and transmitted by a downlink component carrier, wherein a common field preset in the DCI is configured as one of a transmission power control (TPC) command and an ACK resource indication (ARI) command; the common field in at least one piece of the DCI transmitted by a downlink primary component carrier is configured as the TPC command, and the common field in at least one piece of the DCI transmitted by a downlink non-primary component carrier is configured as the ARI command; and
a feedback module, configured to feed back Acknowledgement/Negative-acknowledgement (ACK/NACK) information according to the common field in at least one piece of the DCI.

19. The user equipment according to claim 18, the at least one piece of the DCI transmitted by the downlink primary component carrier comprises DCI corresponding to physical downlink shared channel (PDSCH) transmission of the downlink primary component carrier.

20. The user equipment according to claim 18, wherein the common field is a TPC command field.

* * * * *